UNITED STATES PATENT OFFICE.

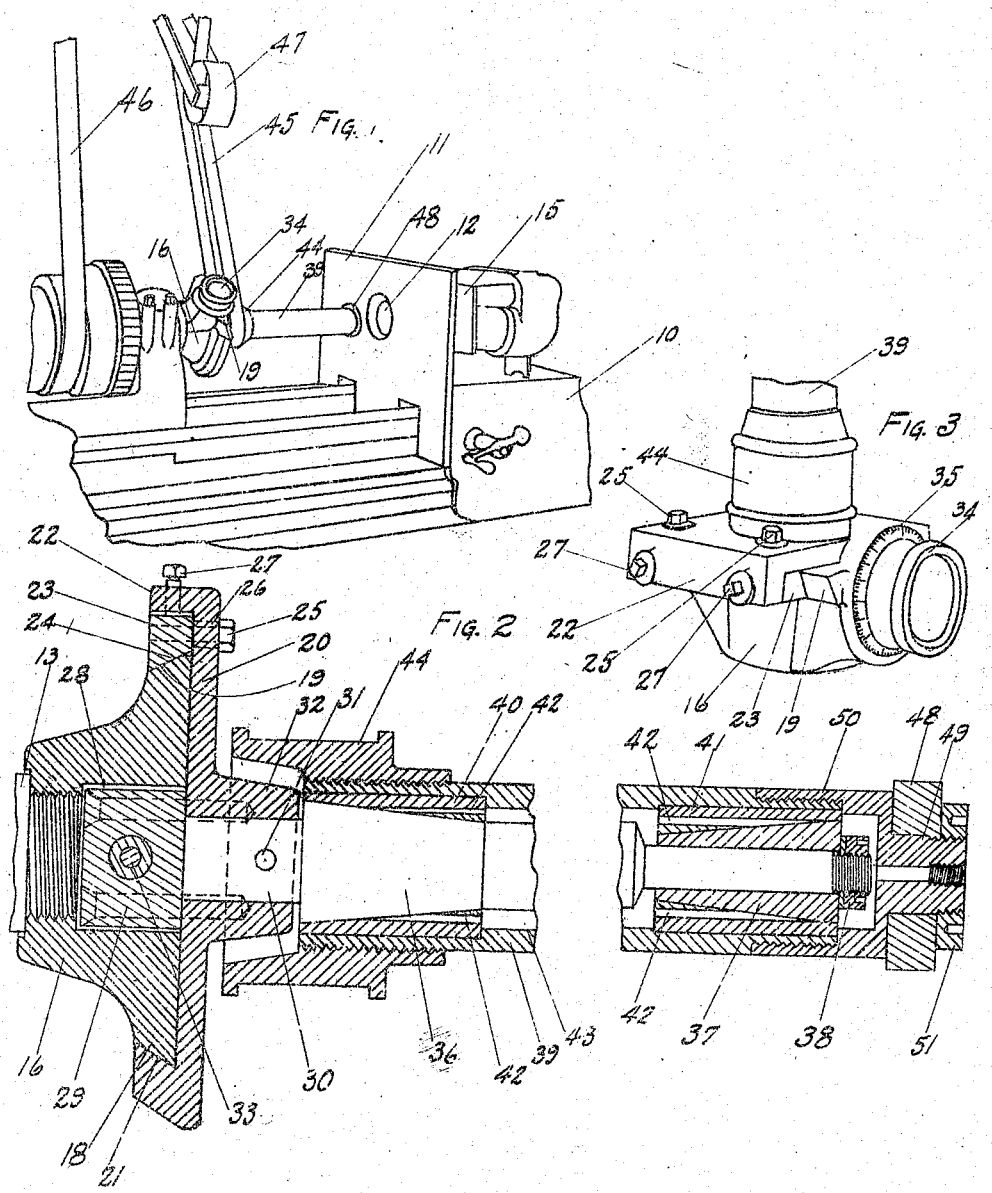

CHARLES H. SCHOLER AND FRANK W. NEWTON, OF MINNEAPOLIS, MINNESOTA, ASSIGNORS, BY DIRECT AND MESNE ASSIGNMENTS, TO CONTINENTAL GRINDER COMPANY, OF MINNEAPOLIS, MINNESOTA, A CORPORATION.

CYLINDER-GRINDING ATTACHMENT FOR ENGINE-LATHES.

1,191,913. Specification of Letters Patent. Patented July 18, 1916.

Application filed March 5, 1915. Serial No. 12,376.

*To all whom it may concern:*

Be it known that we, CHARLES H. SCHOLER and FRANK W. NEWTON, citizens of the United States, residing at Minneapolis, in the county of Hennepin and State of Minnesota, have invented certain new and useful Improvements in Cylinder-Grinding Attachments for Engine-Lathes, of which the following is a specification.

Our invention relates to an attachment to engine lathes for grinding cylinders, and has for its object to provide a member which may be directly connected with the spindle of the lathe and set relative to the axial center of said spindle so as to be turned through circumferences of varying diameter according to the diameter of the cylinder to be ground, together with independent means for rotating the grinding-head independently of the spindle. We also provide means for securing the cylinder to be ground upon the lathe-carriage so that the turning and work-feeding elements of the lathe are employed in connection with our mechanism.

The full objects and advantages of our invention will appear in connection with the detailed description thereof and are particularly pointed out in the claims.

In the drawings, illustrating the application of our invention in one form,—Figure 1 is a perspective view of a portion of a lathe including our improvements. Fig. 2 is a longitudinal section taken through our grinding attachment. Fig. 3 is an enlarged perspective detail view of the adjusting means.

As shown, the lathe-carriage 10 has bolted thereto a face-plate 11 provided with an opening 12, which is centered with respect to the lathe-spindle 13. The face-plate 11 is ground flush and true with respect to the face of the carriage 10, so that when bolted thereon the surface of said face-plate away from the spindle will be perpendicular to the axis of said spindle. The base-plate 15 of the cylinder to be ground is first trued up in the usual way and then is bolted to the face-plate 11 so that the center of the cylinder will be at the axial center of the opening 12.

A head 16 is secured onto the end of spindle 13 in place of the usual chuck plate. This head is provided with beveled guide flanges 18, 19 at opposite sides of the head and extending parallel with one another. A plate 20 has a beveled flange 21 engageable over flange 18 and a right-angled flange 22 at the other side of said plate and parallel with flange 21. The flange 22 is spaced from the beveled guide 19, and in this space is mounted a binder-strip 23 having a beveled face 24 engaging the beveled guide 19. The binder-strip 23 is secured to the plate 20 by bolts 25, which extend through slots 26 in the plate 20. Set bolts 27 extending through flange 22 serve to set the binder-strip 23 firmly against guide flange 19 and lock the plate 20 upon the head 16. The head 16 has formed therein a channel 28 which is between and parallel with guides 18 and 19. In this channel is a block 29 securely bolted to head 20, and a mandrel 30, said mandrel 30 in turn being secured by pin 31 to a hub 32 formed on plate 20. The block 28 has a threaded aperture extending through the same parallel to guides 18, 19, through which extends threaded shaft 33 on a hand screw 34 at one side of head 16. The screw 34 has thereon a scale 35 by which the position of mandrel 30, with reference to the axial center of lathe-spindle 13, may be indicated.

The mandrel 30 has thereon a pair of oppositely-disposed conical bearing-members 36 and 37, the bearing member 37 preferably being separate from the mandrel and held thereon by means of nut and washer 38. A sleeve 39 is provided with bearing-blocks 40 and 41 engageable with the bearing members 36 and 37 and each provided with oil holes 42, through which oil from a central chamber 43, within sleeve 39 and surrounding mandrel 30, may pass to the different parts of the bearing surfaces 36 and 37. The sleeve 39, together with the bearing-members 40 and 41, therefor, is adapted to turn upon the bearing surfaces 36 and 37 of mandrel 30 and is held for rotation about the axial center of mandrel 30. A pulley 44 is fast on sleeve 39 and is driven by a belt 45 from another countershaft than that from which a belt 46 drives the lathe-spindle. A swinging pulley belt tightener 47 engages belt 45 and compensates for the variations which result from the rotation of the plate 20 and parts carried thereby, including pulley 44, by spindle 13 when the axial center of mandrel 30 is outside of the axial center of spindle 13, as will always be the case when the machine is in operation. A grinder-head 48 is secured upon a neck 49 of a cap 50 screwed upon the end of sleeve 39 by means of a nut 51, and, of course, the grinder-head may be changed as desired.

In operation, after the face-plate 15 of the cylinder has been trued and planed, the same is secured in position upon the plate 11, which is bolted to the lathe-carriage 10, as indicated in Fig. 1. By means of the hand screw 34 the plate 20 is set so that when spindle 13 is driven the grinder 48 will be caused to travel about the interior surface of the cylinder. When the machine is being driven the grinder will be rapidly rotated with sleeve 39 about mandrel 30, and at the same time carried about the inside of the cylinder by reason of the rotation of the plate 20 and the sleeve 39 carried thereby with the lathe-spindle 13. These two rotations being in the same direction the aggregate friction speed of the engaging portion of the grinder 48 will be exceedingly high, so that a rapid and efficient grinding action will take place. The lathe-carriage is, of course, operated by the usual feeding mechanism of the lathe to feed the cylinder longitudinally along the sleeve 39, so that the grinding action continues progressively from the open outer end to the inner end of the cylinder.

The advantages of our invention will be obvious. The mechanism is a true attachment, as it is immediately and readily applied to an existing engine lathe without rearranging the parts thereof or requiring anything excepting the removal of the chuck plate and the bolting of plate 11 to the lathe-carriage. The grinder-head 48 is itself given the differential rotative movement for causing it to travel about the interior wall of the cylinder instead of rotating the cylinder, as is done with the usual form of grinder mechanism. The cylinder-plate 15 must be trued and planed in any event, and, this having been done, a means is provided of readily and efficiently positioning the cylinder for the grinding action by merely bolting the cylinder-base 15 to the plate 11.

We claim:

1. A cylinder grinding attachment for engine lathes comprising means for supporting said attachment from the lathe spindle, grinding means enveloping said supporting means and rotatable thereon, means to adjust the supporting means laterally at right angles to the lathe spindle, and means to independently drive the grinding means.

2. A cylinder grinding attachment for engine lathes comprising a supporting rod attached to the lathe spindle parallel with the axis of the lathe and adjustable laterally at right angles to said lathe axis, a sleeve rotatable on said supporting rod and having a grinding wheel attached to it, and means for independently driving said sleeve.

3. A cylinder grinding attachment for engine lathes comprising a supporting rod attached to the lathe spindle parallel with the axis of the lathe and adjustable laterally at right angles to said lathe axis, a sleeve rotatable on said supporting rod and having a grinding wheel attached to it, and a pulley on said sleeve for driving it.

4. A cylinder grinding attachment for engine lathes comprising a head secured to the lathe spindle, a pair of parallel guides on said head in a plane at right angles to the spindle, a plate slidably mounted on said guides, means for adjusting said plate along said guides, a supporting rod parallel with the lathe axis and attached to said plate, a sleeve rotatably mounted upon said rod and carrying a grinding wheel, and means to drive said sleeve.

5. A cylinder grinding attachment for engine lathes comprising a supporting rod attached to the lathe spindle parallel with the axis of the lathe and adjustable laterally at right angles to said lathe axis, a fixed conical bearing on the end of said supporting rod nearest the lathe spindle, a removable conical bearing on the free end of said supporting rod, a sleeve rotatable about said rod on said conical bearings, a cap carrying a grinding wheel attachable to said sleeve, and means to independently drive the sleeve.

6. A cylinder grinding attachment for engine lathes comprising a head secured to the lathe-spindle, a mandrel mounted upon said head, means for adjusting said mandrel transversely of the head, a grinder-spindle journaled upon said mandrel, a pulley on said grinder-spindle, a belt for driving said pulley and grinder-spindle while the same is being turned by the lathe-spindle, and a belt tightener engaging said belt for compensating for the differential movement of said pulley.

In testimony whereof we affix our signatures in presence of two witnesses.

CHARLES H. SCHOLER.
FRANK W. NEWTON.

Witnesses:
F. A. WHITELEY.
H. A. BOWMAN.